Aug. 6, 1957   Z. LORENIAN   2,801,444
METHOD AND APPARATUS FOR MAKING HOLLOW ARTICLES WITH
ONE OR BOTH ENDS CLOSED OR WITH BOTH ENDS OPEN
AND ALSO FOR MAKING SOLID ARTICLES
Filed Aug. 10, 1951   3 Sheets-Sheet 2

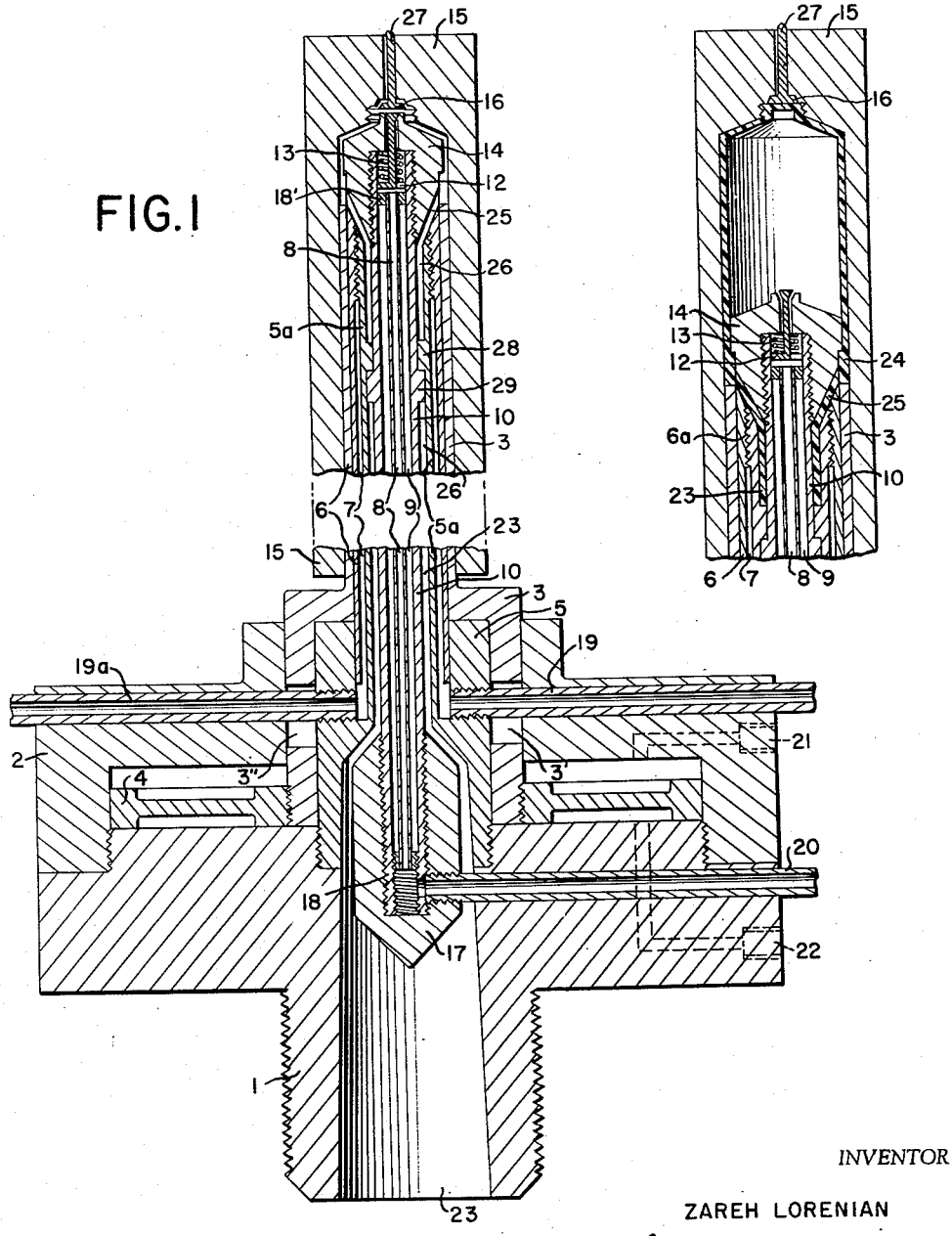
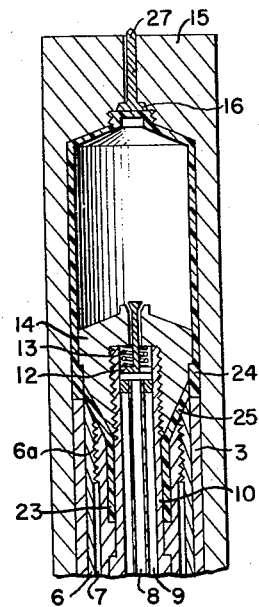

INVENTOR

ZAREH LORENIAN

BY

ATTORNEY

Aug. 6, 1957   Z. LORENIAN   2,801,444
METHOD AND APPARATUS FOR MAKING HOLLOW ARTICLES WITH
ONE OR BOTH ENDS CLOSED OR WITH BOTH ENDS OPEN
AND ALSO FOR MAKING SOLID ARTICLES

Filed Aug. 10, 1951                              3 Sheets-Sheet 3

INVENTOR

ZAREH LORENIAN

BY *Eric E. Granke*

ATTORNEY

United States Patent Office 2,801,444
Patented Aug. 6, 1957

2,801,444

METHOD AND APPARATUS FOR MAKING HOLLOW ARTICLES WITH ONE OR BOTH ENDS CLOSED OR WITH BOTH ENDS OPEN AND ALSO FOR MAKING SOLID ARTICLES

Zareh Lorenian, Milan, Italy

Application August 10, 1951, Serial No. 241,214

9 Claims. (Cl. 18—30)

The present invention relates to methods and to apparatus for forming articles of plastic material, whether hollow and closed at one end or closed at both ends, or open at both ends, or whether solid. The present application is a continuation-in-part of my prior U. S. patent application Serial No. 19,376, filed April 6, 1948, and now abandoned.

In one aspect the invention relates to a method and to apparatus for forming hollow plastic articles having portions which are of different wall thickness, such as, for example, collapsible tubes of the type commonly employed for dispensing toothpaste, cosmetics, pigments, and the like. Various methods have heretofore been proposed for manufacturing thin-walled, hollow, plastic articles but each has certain disadvantages and defects. The conventional form of collapsible tube has side walls of quite thin, flexible wall section, but the shoulder at the neck end of the tube must be relatively thicker to resist distortion and the tubular neck must be sufficiently heavy to carry a thread for holding a removable cap.

The formation of such hollow tubes by molding has not proven satisfactory because of the difficulty of forcing the plastic material into a mold cavity sufficiently thin to produce the side wall portion of the tube. Such tubes have been formed by dipping a mandrel into a plastic solution, but unless the neck end of the tube is repeatedly dipped the whole tube will be of uniformly thin-walled section. Moreover, the evaporation of solvent from the thin wall section is likely to leave open capillaries that permit the evaporation or escape of essential oils. The methods of extrusion used for the production of metal tubes, such as lead, tin and aluminum tubes, are not satisfactory either, because the known plastic resins do not have the extruding qualities of the soft metals. Commercially, the most satisfactory plastic dispensing tubes are formed by separately forming the neck and side walls and then cementing these together, but this is a relatively expensive operation, and the finished tubes are liable to be weak at the juncture of the side wall and neck.

Hollow articles, especially bottles and containers with necks, have been formed by blowing. In a blowing operation, however, thickness of material and the air pressure must be related very accurately to one another. Furthermore there must be accurate control of the heat of the material.

The thermoplastic materials lend themselves very well to methods of injection molding where the heat-softened plastic compound is forced from a cylinder under great pressure through a restricted orifice into a mold cavity. With the injection molding process, however, it is extremely difficult to manufacture hollow objects having more than a limited length and less than a certain wall thickness.

Similarly, if it is sought to manufacture by the injection process plastic articles which are solid and which have more than a limited length, the process material gets cold and sets before the whole of the article can be finished. To avoid this the mold or matrix is often heated. This requires, however, for each operation a certain time for heating up and for subsequently cooling the matrix or mold, which is difficult and moreover increases the production time.

One object of the present invention is to avoid the disadvantages of the injection process and of other previous processes and to make it possible to produce a hollow article having different wall thicknesses in a single operation and in a single piece.

Another object of the invention is to provide a method and apparatus for producing hollow articles, including hollow articles having both ends open, or having one end closed or having both ends closed, of any desired length and of any desired wall thickness or shape, or variation in wall thickness, automatically in series-manufacture and with great high productive capacity, in which each article may be made in a single continuous operation and as a single piece.

A further object of the invention is to provide a method and apparatus for making a solid article of any desired length in a single continuous operation and as a single piece.

Another object of the invention is to provide a method and apparatus for simultaneously forming and filling hollow articles having one or both extremities closed in which the filling operation can be effected during manufacture of the article, and in which the article may be filled even with the material for which it is intended to be a package.

In the process of the present invention a conventional screw-press, extrusion press or the like can be used. A mold or matrix shaped internally to form the outside wall of the article or part of said outside wall, and a core, which is provided internally at least with two feed ducts and at least with two delivery ports, are used. At least one feed duct and delivery port in the core are for the process material. At least one feed duct and delivery port are for supplying a medium into the hollow space between the walls of the article being formed by the process material. This medium may be a cooling medium to cool the plastic process material; it may be further process material to fill such hollow space and make the article solid; or it may be the material, such as toothpaste, shaving cream, pigment, etc., which is to be packaged in the article that is being manufactured. In this last-named instance, then, the package can be filled as it is being made.

The delivery port in the core for the process material can extend in an axial direction or in a radial direction or both. The delivery port for the cooling or filling medium is valve-controlled.

The matrix or mold, as already indicated, can have the desired exterior form of the object to be manufactured, or can have the exterior form of only part of the object. The matrix or mold can be constructed in any form and may comprise one or more pieces separated transversely or longitudinally. It has a valve-controlled port through which air may escape from between the mold and the core.

The mold and the core are so constructed that they can be separated from one another. The core is inserted into the matrix or mold, before starting formation of the article, so that the innermost part of the core is spaced from the confronting inside face of the mold a distance determined by the desired thickness of one end wall of the article which is to be manufactured, in the case of a hollow article.

In the formation of a hollow article, the process material is fed through the core out of the delivery port or ports into the space between the outside of the core and the inside wall of the mold. The process material flowing into this space forces air out of the space through the valve port in the head of the mold. As soon as the process material has filled this space and the space between the innermost end of the core and the opposed inside face of the mold, the valve in the mold is closed by pressure on it of the process material. This valve may be formed with a stem which will project outside the mold when the valve is seated so that the valve when seated may act as a signal, or this valve may be constructed to operate any suitable signal as it closes. When this valve signals its closing, the cooling medium, in case the article is to be hollow, the filling process material, in case the article is to be made solid, or the filling, dispensable material, in case the article is to be filled, as it is made, with the dispensable material that is to be packaged, is supplied to the interior of the article through the valve port in the core, this valve being opened by pressure of the filling medium. Simultaneously the mold is separated gradually from the core. During this relative separation the filling medium fills the interior of the article that is being formed, preventing creation of a vacuum, and cooling the interior of the article, or filling it with process material, or dispensable material as the case may be.

Solid articles can be made out of one or more materials. These materials can be mixed together or can remain separate and distinct in the article, either longitudinally or transversely separated or in any other way.

Articles can be formed of various shapes; and the mold and the core can both have grooves, hollows, reliefs, inscriptions, designs, or successive numbers, and can be made in high relief or in bas relief, and can be made in a single color or in different colors.

Where the article that is to be manufactured is closed at both ends but is hollow inside, the article is manufactured according to the process of the invention as already described with one closed end, and with side walls integral therewith and after the core has been removed, the sides of the material are brought together or pressed toward the center of the article closing in this way its other end.

By the process of the present invention either solid articles or hollow articles can also be made where some parts have been previously fabricated by placing such previously-fabricated parts inside the mold and then introducing the additional process material by the process of the present invention.

In the drawings:

Fig. 1 is an axial section, partly broken away, showing a core and a mold made according to one embodiment of the present invention and in the positions they may occupy at the start of the production process of the present invention;

Fig. 2 is a fragmentary axial section of the mold and core showing them in a relatively separated position during progress of the forming process;

Figure 3:
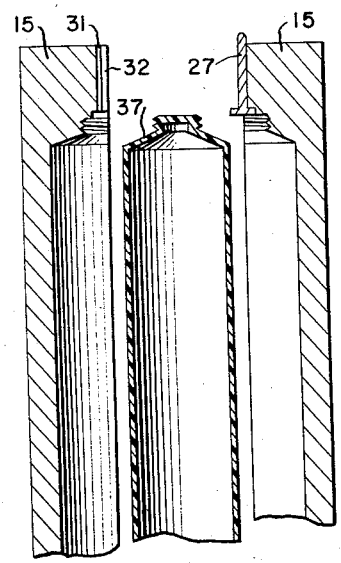
Fig. 3 is a fragmentary axial section showing the mold opened up after the production of a collapsible tube and showing fragmentarily, also, the tube itself.

Referring now to the drawings by numerals of reference and first to the embodiment of the invention shown in Figs. 1 to 3 inclusive, 1 denotes the base portion of the core. Threaded on this is a part 2. The parts 1 and 2 form a cylinder in which a piston 4 reciprocates. Piston 4 is threaded to the base of a sleeve 3 which is guided at its lower end in part 2 and which is reciprocable in the mold 15. The part 1 is fastened to the screw press or other machine on which the operation is effected.

The sleeve 3 slides on a tubular guide 6 which is fastened to a part 5 which is threaded into the base portion 1 of the core. Part 5 is provided with a tubular extension 5a which is spaced from sleeve 6 for the greater part of the lengths of the tubular extension and of the sleeve but which is threaded to the sleeve at the upper ends of both. The annular space between the sleeve 6 and the extension 5a of the part 5 provides a channel or duct 7 for a heating or cooling fluid. This fluid is deliverable to the channel 7 through the pipe 19 that is mounted in the part 2, that extends through a slot 3' in sleeve 3, and that threads into part 5. The heating or cooling fluid is conducted away through pipe 19a which is mounted in part 2 diametrically opposite pipe 19, and which extends through slot 3" in sleeve 3, and which threads at its inner end into part 5.

Instead of using channel 7 to provide a heating fluid, an electrical resistance unit can be built into the duct 7 to provide heat. Heating serves to keep the process material in a warm, pliable state; cooling serves to lower the temperature of the material to the correct temperature.

Mounted coaxially within the tubular extension 5a of member 5 and threaded at its lower end into a part 17 is a tube 10. Thus tube is separated from tubular extension 5a so that an annular channel or duct 26 is provided between them through which the process material from inlet 23 is fed to the delivery opening or port 25 (Fig. 2). The plastic process material may be supplied from an outside source through connections (not shown) to the press or other machine on which the core is mounted.

Threaded on the upper end of tube 10 is the core head 14. The delivery opening or port 25 is bounded by the lower externally conical face of this core head and the opposed internally conical upper faces of tubular extension 5a and sleeve 6.

The sleeve 3 terminates at its upper end above the lower end of head 14; and the head 14 above sleeve 3 is provided with a peripheral recess 24. With the inside wall of the mold 15, this recess forms a ring-shaped groove that allows smooth, uniform delivery of the process material into the space between the core assembly and the mold 15. The size of this ring-shaped recess can be varied during the working process by movement of the sleeve 3 of the core assembly so that the speed and thickness of the flow of the material can be varied. This is essential for obtaining the desired wall-thickness especially for articles with considerably varying wall-thicknesses.

The outer cover or sleeve 3 is, as previously stated, moved by the piston 4. This piston may be actuated by air pressure. Ducts 21 and 22 within the parts 2 and 1, respectively, serve to supply compressed air to opposite sides of the piston 4.

Mounted within the tube 10 coaxially therewith but spaced therefrom is a tube 8. This is held axially in position in tube 10 by rings 18 and 18' that thread into tube 10. A cooling medium or a filling medium may be supplied to tube 8 through pipe 20. This pipe is mounted in part 1 and threads into part 17 and tube 10. Part 17 together with part 5 forms an entrance channel for the entry of the process material into the space 26 between sleeve-like extension 5a and tube 10.

Through the pipe 20 and duct 8 a cooling medium may be supplied to cool the article being produced and prevent building up of a vacuum in the interior of the article during its production. Through the pipe 20 and duct 8 there may also be supplied, instead of a pure cooling medium, further process material for forming the interior of a solid article. Through the pipe 20 and duct 8 there may also be supplied, instead of a pure cooling medium or additional plastic process material, the material which is to be packaged in the hollow container that is being manufactured. This last-named material may be in liquid, pasty, or powdered form; and so it may be packaged substantially simultaneously with the formation of the plastic package that is to contain it. The additional plastic process material and the material which is to be packaged are, of course, preferably delivered in a cool state so that they also act as coolants for the plastic process material and prevent building up a vacuum during formation of the article.

The hollow annular space 9 between the tube 10 and the inner tube 8 serves for insulating in order to avoid transmission of heat from the process material 23 in the duct 26 to the medium in the duct 8 and vice-versa.

The entry of the filling medium, whether pure coolant, process material, or dispensable material to be packaged, is controlled by a valve 12 which is reciprocably mounted in core head 14 to control a central port therein that communicates with duct 8. This valve is constantly urged toward closed position by a coil spring 13.

The upper face of the core head 14 is shaped to correspond to the inner shape of one end of the container to be produced.

Correct centering and uniform spacing between the duct 10 and the tubular extension 5a of the part 5, in order to provide channel 26 for the process material 23, is insured by the lugs 28 which project internally of extension 5a and seat against the outside wall of tube 10. These are so constructed that they only slightly diminish the transverse section of channel 26 and do not hinder the flow of process material through this channel. The lugs 28 serve with lugs 29 built up in like manner on the outside of duct 10, to hold the inner parts of the core in the correct position.

The mold 15 is made in two halves joined in an axial plane. It is provided at its end or top with a central opening 32 (Fig. 3) that may be closed by a valve 16 (Figs. 1, 2). An axial channel 31 is provided at one side of the hole 32. The valve 16 is open at the beginning of the working process so that during the inflow of the process material 23 into the space between the mold and the delivery port 25 of the core, air may escape from this space through channel 31. When the inflowing process material 23 has filled this space it closes the valve 16.

The valve 16 may be held open by gravity or a light spring. It is provided with a stem 27 that is long enough to project up beyond the top of mold 15 when the valve is closed, as shown in Fig. 2. From the position of the valve stem 27 it can be seen when the space between the base of the mold and delivery port 25 is filled with process material. The valve 16 for this reason acts as a signal valve, for at the instant when this valve is closed the relative motion between the mold and the core must be started for further formation of the article, and, in the case of hollow articles, for inflow of the cooling medium or of the dispensable substance which serves to fill the hollow body through the valve 12.

The method of operation is as follows. At the beginning of the process the mold 15 is closed on the core as shown in Fig. 1, and the valve 16 is open. The core is located within the mold so that the forward or uppermost end of the core is at a distance from the top of the mold corresponding to the thickness of the base of the article which is to be manufactured. The material delivery port 25 with the ring-shaped recess 24 is near the base of the mold 15 as shown in Fig. 1. At the beginning of the operation the mold and the core are motionless. The process material 23 is delivered into the duct 26 and thence through the delivery port 25 to the ring-like recess 24 and is distributed from here uniformly in the space between the end of the mold 15 and the outermost end or head 14 of the core, while simultaneously the air which is in this space escapes through the open valve 16. When this space has been filled with the process material, the process material forces the valve 16 closed. The valve stem 27 of the valve then projects beyond the top of the mold signalling that it is time to begin the withdrawal motion of the mold. The mold is moved away from the core at controlled, gradual speed as shown in Fig. 2, and simultaneously the process material is fed continuously through the duct 26, the delivery port 25, and the recess 24 into the mold 15. The withdrawal of mold 15 is effected by operation of the machine used in the process. During the withdrawal operation, in order to avoid an internal vacuum, and in order to cool the hollow article being formed, or to fill the hollow article with other process material or with the dispensable material with which the hollow body is to be filled, a cooling medium, process material or dispensable material is delivered by the duct 20 and the channel 8 under control of the valve 12 into the space provided between the core and the already-formed portion of the hollow body. The pressure of the medium fed through duct 8 will open valve 12. Feed of this medium will continue until the side walls of the article, which is being made, have been formed to the desired length. When the mold 15 has reached its end position and the hollow body has been formed to the desired length, the flow of the process material 23 is stopped. Likewise the entry of the medium or substance through the channel 8 is simultaneously stopped. The mold 15 is then opened, as shown in Fig. 3 and the finished, empty or filled, article is removed. After emptying the mold the same can be closed again and returned to starting position.

In Fig. 3 there is shown a tubular container 36 such as may be formed by the process of the present invention.

It is to be noted that the atmospheric air or cooling substances which are introduced into the hollow articles while they are being formed is not for the purpose of expanding or inflating the hollow article but simply for cooling the deposited material and also to prevent a vacuum inside the article during its formation.

Figure 4:
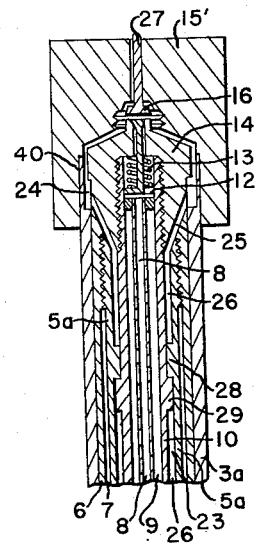
Fig. 4 is a fragmentary axial section similar to Fig. 1, showing a partial mold such as may be employed in a modification of the invention and showing the core, which cooperates therewith, in position before the production process has been begun.
Figure 5:
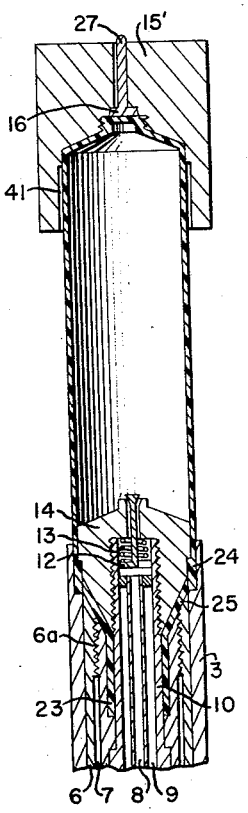
Fig. 5 is an axial section, similar to Fig. 2, showing the partial mold and core of Fig. 4 at a further stage in the production process.

Figs. 4 and 5 show a somewhat modified form of core and mold. Here the mold 15' does not extend completely down over the sleeve 3a of the core but only over the upper part of this sleeve. The sleeve 3a is provided with a thin forwardly projecting wall 40 which is received in a recess 41 in the mold 15'. Otherwise the construction and operation is as previously described. In the embodiment of the invention shown in Figs. 4 and 5 the article, which is to be produced, has a constant cross section over at least part of its length, and the mold 15' is limited only to one part of the article, namely, the extremity of the article, being limited to that part of the article whose cross-section is not constant.

Figure 6:
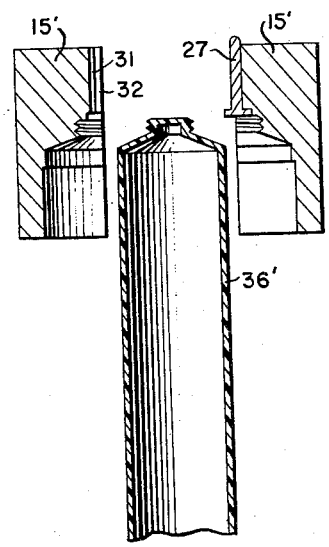
Fig. 6 is a section similar to Fig. 3, showing the opened partial mold after production of a collapsible dispensing tube and showing the finished tube fragmentarily.

36' (Fig. 6) denotes a tubular finished body such as may be formed with the apparatus of Figs. 4 and 5. It may be identical in structure with the tubular container 36 of Fig. 3.

Figure 7:
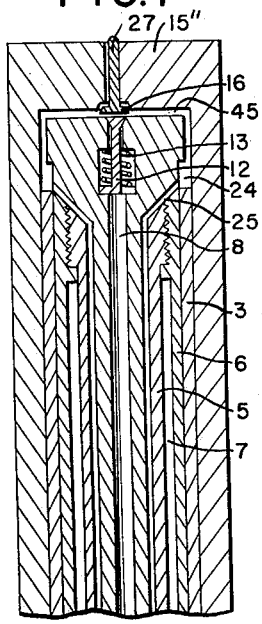
Fig. 7 is an axial section, similar to Figs. 1 and 4, showing a mold and a core made according to a still further embodiment of the invention for forming a hollow body closed at one or both ends in the positions the mold and core occupy before the production process has been begun.
Figure 8:
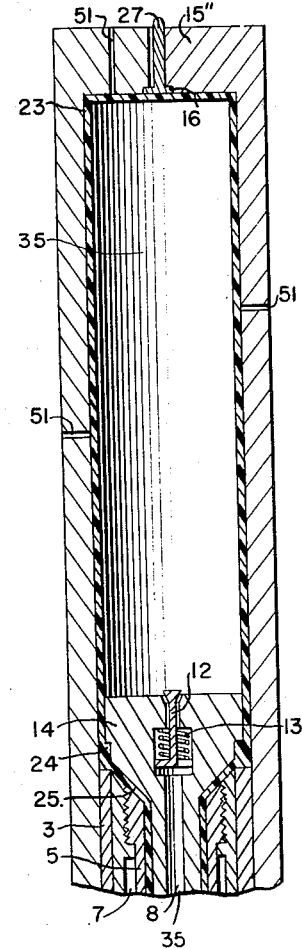
Fig. 8 is an axial section similar to Figs. 2 and 5 showing the mold and core of Fig. 7 at a further stage in the production process and showing the hollow body being filled during production with the dispensable material for which the hollow body is to serve as a container or package.
Figure 9:
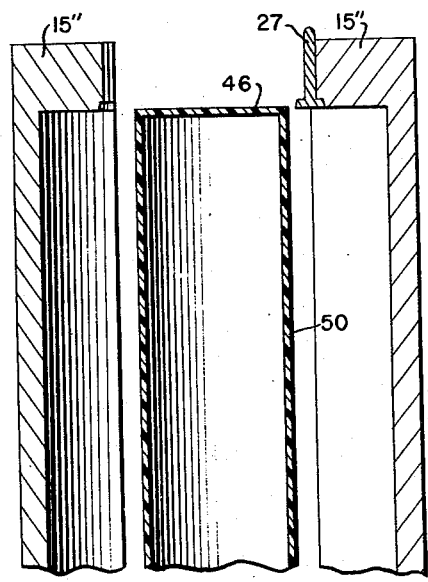
Fig. 9 is a setion similar to Figs. 3 and 6, showing the opened mold with the finished and filled hollow body between the parts of the mold.

Figs. 7 and 8 show a still further modification of the invention. Here a mold and core are shown suitable for forming a body with a closed upper end. Here, the mold 15″ and core head 14″ are formed with the opposed plane surfaces which provide between them a space 45 for forming one end 46 of the article 50 which is to be manufactured. Otherwise the construction and operation is similar to that previously described. During formation the body 50 may be filled with a cooling medium at 35 or with the material which the body is intended to contain. As in the previously described embodiments of the invention, the mold 15″ is formed in two parts for easy separation.

From the preceding description it will be seen that I have provided a process for forming a hollow article closed at one or both ends, or open at both ends, or a solid article, from plastic material in a single piece without necessitating any patching or gluing or cementing of parts together and despite variation in thickness of the side walls of the article, and regardless of the length of the article or the thickness of its side walls. Moreover, the article can be provided with threads, inscriptions or designs in high relief or in bas relief; and furthermore different parts of the article can be formed with materials of different colors. Still further during the actual formation of a hollow body itself it can be filled with the material which it is intended to package. The article can have any shape, dimension, diameter, length, and side wall thickness. With the process of the present invention hollow articles can also be manufactured which are composed of several different kinds of materials which may remain separated and distinct in the article or which may be mixed together in the article.

The accuracy of the thickness of the walls of hollow articles is obtained by variation in at least one of the following factors: The space between the mold and the core, the magnitude of the delivery outlets or ports for the materials, the relative speed of separation of the mold and the core during deposition of the materials on the inner wall of the mold, the speed of introduction of the process material, the speed of introduction of the cooling material, the pressure of introduction of said materials or substances, and the size and shape of the recesses situated at the material outlets or ports.

In the illustrated embodiments of the invention, one channel 26 and one delivery port 25 is shown for the process material. It will be understood, however, that the core may be provided with additional process material feed ducts and with additional process material outlet openings for conveying and depositing simultaneously different process materials.

The additional feed ducts may be formed by providing additional sleeves around tubular extension 5a and spaced therefrom. The outlets for these additional feed ducts may join one another or be spaced axially from one another depending upon whether the process materials are to be mixed together, or remain unmixed and be individually recognizable in the finished article in a predetermined zone thereof.

Figure 10:
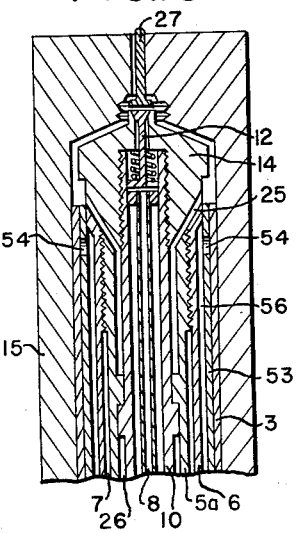
Fig. 10 is a fragmentary axial section, similar to Figs. 4 and 7, and illustrating a still further modification of the invention.

One embodiment of the invention having additional feed ducts for the process material is illustrated in Fig. 10. Here the mold 15 may be identical with that illustrated in Fig. 1, and like the mold of Fig. 1 may have a signal valve with an elongated valve stem 27 mounted therein. The core may have a head 14 such as previously described. This head 14 is threaded on the upper end of a tube 10 as previously described. Mounted within the tube 10 coaxially therewith is a tube 8, such as previously described, held axially in position as described with reference to Fig. 1. The tube 8, as previously described, is to supply the medium for filling the article which is to be produced, whether that medium be a coolant, other plastic material to make the article solid, or the substance which is to be contained by the hollow article that is being formed.

As in the previously described embodiments of the invention, there is mounted in the head 14 a valve 12 which is normally spring-pressed to closed position but which can be opened by pressure of the material flowing out of the upper end of the tube 8. As in the previously described embodiments of the invention, the tube 8 is spaced from the tube 10 so that it may be insulated from the tube 10 by air or any suitable insulating medium.

Surrounding the tube 10 but spaced therefrom is the tubular extension 5a, which may be constructed as described with reference to Fig. 1 and which may be held in correct relation to the tube 10 by lugs such as denoted at 28 and 29 in Fig. 1. One of the plastic process materials is supplied to the delivery port 25 through the channel 26 between the tube 5a and the tube 10.

Surrounding the tubular extension 5a and secured thereto at its upper end is a tube 6, similar to the tube 6 of Fig. 1. As in Fig. 1, a heating or a cooling fluid may be supplied to the channel 7 between the tube 6 and the tube 5a to keep the process material in a warm pliable state, or to cool it to the correct temperature, as may be desirable.

Surrounding the sleeve 6 and coaxial therewith are two sleeves 3 and 53. These two sleeves are both axially slidable; and the sleeve 53 slides within the sleeve 3. The sleeve 53 is spaced from the sleeve 6. It is provided adjacent its upper end with ports 54. Additional plastic process material may be supplied through the channel 56 between the sleeve 6 and the sleeve 53 to the ports 54.

The sleeve 3 may be reciprocated by a piston 4 as in the embodiment of the invention illustrated in Fig. 1. The sleeve 53 may be reciprocated in similar manner by a separate piston.

When the two sleeves 3 and 53 are in the position shown in Fig. 10, the port 25 is uncovered, but the ports 54 are covered. The process material is supplied then only through the port 25. When the sleeve 3 is lowered sufficiently to uncover the ports 54, then process material can be supplied through both the port 25 and the ports 54. When the sleeve 53 is raised sufficiently to close off the port 25 and the sleeve 3 is lowered sufficiently to uncover the ports 54, then process material will be supplied only through the ports 54. Thus, by movement of the sleeves 3 and 53 control may be had over the process material used in formation of the outside of the article that is being made. The two process materials supplied through channels 26 and 56 may be fed separately from one another or may be mixed together.

The present invention may be used in the manufacture of articles of both thermo-plastic as well as thermo-setting materials, both organic and inorganic. Both the mold and the core are made from non-porous materials.

While the invention has been described in connection with several different embodiments thereof, therefore, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

For instance the walls of the mold 15—15″ may be provided with holes 51 or apertures and relative channels or tubes for producing with known means a vacuum in the mold before and/or during the introduction of the material therein, whereby the material is sucked onto said walls.

Having thus described my invention, what I claim is:
1. The method of making a shaped article from material formable under heat by means of a mold and a nozzle, which comprises positioning the mold over and around the nozzle with the inner bottom surface of the mold axially spaced from the end of the nozzle to form a generally cup-shaped interspace between mold and nozzle end, extruding the material in warm and formable condition through the outlet of said nozzle into said interspace and thereby expelling air from said interspace until said interspace is completely filled with material, then gradually moving the mold and nozzle axially away from one another while continuing to extrude the material through said nozzle outlet into the axially lengthening space between the nozzle end and the mold, and supplying simultaneously with said movement a cooling medium into the interior of the body being formed, whereby the material is caused to cool and solidify in the position and shape defined by the relative motion between mold and nozzle.

2. The method of making a closed-ended hollow body from material formable under heat by means of a mold having a cavity, and a nozzle insertable into said cavity and having an annular outlet, which comprises positioning the mold over the nozzle with the bottom surface of the mold cavity axially spaced from the end of the nozzle to form therewith a generally cup-shaped interspace having the thickness of the closed end of the body to be formed, extruding the material in warm and formable condition through said annular nozzle outlet into said interspace and thereby expelling air from said interspace through duct means in said mold until said interspace is completely filled with material to form said closed end of said hollow body, then gradually moving the mold axially away from the nozzle while continuing to feed the material through said annular nozzle outlet into the axially lengthening peripheral space between nozzle outlet and mold to form the peripheral wall of the hollow body, and feeding simultaneously with the gradual movement of the mold a cooling medium into the interior of the hollow body, whereby the material is caused to cool and solidify in the position and shape defined by the relative motion between mold and nozzle.

3. The method of making a hollow body from material formable under heat by means of a mold having a cavity and air-escape duct means, and an extrusion nozzle insertable into the mold cavity and having a generally annular nozzle outlet corresponding to the perimeter of the body to be produced, which comprises placing the mold over the nozzle and around the nozzle outlet with the bottom surface of the mold cavity axially spaced from the end of the nozzle to form therewith a generally cup-shaped interspace having the thickness of an axial end of the hollow body to be produced, extruding the material in warm and formable condition through said nozzle outlet into said interspace thereby expelling the air from said interspace through said duct means until said interspace is completely filled with material, then gradually displacing the mold axially away from said nozzle outlet a distance larger than the axial length of said cup-shaped interspace so that during displacement the mold space becomes axially separated from the nozzle while continuing to extrude the material through said nozzle outlet to thereby form the perimetric wall of the hollow body, and feeding simultaneously with the gradual mold displacement a cooling medium into the interior of the hollow body, whereby the material is caused to cool and solidify in the position and shape defined by the relative motion between mold and nozzle.

4. The method of making a closed-ended hollow body from material formable under heat by means of a mold having an air-escape duct, and a nozzle having an annular outer nozzle outlet for the material and a normally closed inner nozzle outlet for cooling medium, which comprises positioning the mold with its inner bottom surface axially spaced from the outlet end of the nozzle to form therewith a generally cup-shaped interspace having the thickness of the closed end of the body to be formed, extruding the material in warm and formable condition through said annular nozzle outlet into said interspace and thereby expelling air from said interspace through said duct until said interspace is completely filled with material to form said closed end of said hollow body, then gradually moving the mold axially away from the nozzle while continuing to feed the material through said annular nozzle outlet into the axially lengthening peripheral space between nozzle outlet and mold to form the peripheral wall of the body, opening the inner nozzle outlet at the beginning of the axial movement of the mold and feeding simultaneously with said movement a cooling medium gradually into the interior of the hollow body being formed, then closing said inner nozzle outlet and stopping the supply of material through the outer nozzle outlet, and permitting the material to cool and solidify in the position and shape defined by the relative motion between mold and nozzle.

5. The method of making a closed-ended hollow body from material formable under heat by means of a mold having an air-escape duct, and a nozzle having an annular outer nozzle outlet for the material and a normally closed inner nozzle outlet for cooling medium, which comprises positioning the mold with its inner bottom surface axially spaced from the end of the nozzle to form therewith a generally cup-shaped interspace having the thickness of the closed end of the body to be formed, extruding the material in warm and formable condition through said annular nozzle outlet into said interspace and thereby expelling air from said interspace through said duct until said interspace is completely filled with material to form said closed end of said hollow body, then gradually displacing the mold axially away from said nozzle a distance larger than the axial length of said cup-shaped interspace so that during displacement the mold space becomes axially separated from the nozzle while continuing to extrude the material through said annular nozzle outlet to thereby form the perimetric wall of the body, opening the inner nozzle outlet at the beginning of the axial movement of the mold and feeding simultaneously with said movement a cooling medium gradually into the interior of the hollow body being formed, then closing said inner nozzle outlet and stopping the supply of material through the outer nozzle outlet, and permitting the material to cool and solidify in the position and shape defined by the relative motion between mold and nozzle.

6. Apparatus for forming an article from plastic material, comprising an extrusion nozzle member having a nozzle end, a peripherally located nozzle outlet near said end, a centrally located outlet port in said end, a valve normally closing said port, said nozzle member having two concentric channels, the outer one of said channels communicating with said nozzle outlet for delivering plastic material thereto, the inner channel communicating with said port for supplying cooling medium thereto; a mold member having a cavity and having a wall provided with a duct through which said cavity communicates with the outside of the mold; one of said mold and nozzle members being movable in coaxial relation to the other between a starting position and an end position; said nozzle end and said nozzle outlet and port being located within said cavity and said nozzle end being axially spaced from the bottom of said cavity and forming together with said mold member a generally cup-shaped interspace when said two members are in said starting position, said duct communicating with said interspace to permit escape of air from said interspace when material enters from said nozzle outlet into said interspace; and said valve having means for opening said valve due to movement of one of said members from said starting position toward said end position; whereby the material extruded from said nozzle outlet during said movement is cooled by cooling medium issuing from said port so as to solidify in the position and shape defined by the relative motion between said two members.

7. Apparatus for forming an article from plastic material, comprising a stationary structure having a protruding nozzle member of elongated and generally cylindrical shape, said nozzle member having a peripherally located nozzle outlet near its protruding end and having a port in said end and a normally closed valve in said port, said nozzle member having a material channel communicating with said nozzle outlet, a channel for cooling medium communicating with said port, and a channel for heat-control medium concentric to said material channel; a mold member having a cavity and having a mold bottom provided with an air-escape duct, said mold member being movable in coaxial relation to said nozzle member between a starting position and an end position; said protruding nozzle end and said nozzle outlet being located within said cavity and said nozzle end being axially spaced from the bottom of said cavity and forming together with said mold member a generally cup-shaped interspace when said mold member is in said starting position, said duct communicating with said interspace to permit escape of air from said interspace when material enters from said nozzle outlet into said interspace; and said valve having means for opening said valve due to movement of said mold member from said starting position toward said end position; whereby the material extruded from said nozzle outlet during said movement is cooled by cooling medium issuing from said port so as to solidify in the position and shape defined by the motion of said mold member relative to said nozzle member.

8. In apparatus according to claim 6, said duct of said mold being located in the bottom wall of said cavity in coaxial relation to said outlet port of said nozzle member; and a normally open valve located in said duct of said mold and having movable valve control structure bordering said interspace for closing said latter valve by the pressure of plastic material filling said interspace.

9. In apparatus according to claim 6, said nozzle member having a tubular passage for heat control medium coaxially surrounding said outer channel for delivering plastic material to said nozzle outlet, and said nozzle member having a tubular heat insulating space located coaxially between said outer channel for plastic material and said inner channel for cooling medium.

References Cited in the file of this patent

UNITED STATES PATENTS

| | | |
|---|---|---|
| 1,598,201 | Koppitz | Aug. 31, 1926 |
| 1,606,705 | Joannides | Nov. 9, 1926 |
| 1,826,945 | McKay et al. | Oct. 13, 1931 |
| 2,122,874 | Whipple | July 5, 1938 |
| 2,177,658 | Kimble et al. | Oct. 31, 1939 |
| 2,178,774 | Bogoslowsky | Nov. 7, 1939 |
| 2,230,188 | Ferngren | Jan. 28, 1941 |
| 2,288,454 | Hobson | June 30, 1942 |
| 2,396,406 | Anderson | Mar. 12, 1946 |
| 2,443,053 | Parmelee | June 8, 1948 |
| 2,449,139 | Posner | Sept. 14, 1948 |
| 2,503,171 | Posner | Apr. 4, 1950 |
| 2,562,523 | Brunet | July 31, 1951 |